May 16, 1939.    W. PETERMANN    2,158,886
COOLING MEANS FOR MIRRORS USED WITH ARC LAMPS
Filed July 24, 1937

Walter Petermann INVENTOR.
BY
Gifford, Scull & Burgess.
ATTORNEYS.

Patented May 16, 1939

2,158,886

UNITED STATES PATENT OFFICE 2,158,886

COOLING MEANS FOR MIRRORS USED WITH ARC LAMPS

Walter Petermann, Berlin-Siemensstadt, Germany, assignor to Opticolor Aktiengesellschaft, Glarus, Switzerland, a corporation of Switzerland Application July 24, 1937, Serial No. 155,451
In Germany August 5, 1936

9 Claims. (Cl. 240—47)

This invention relates to a novel and improved form of cooling means for mirrors used with arc lamps.

With arc lamps, in which a high intensity light source is used, it is advantageous to cool the mirror to protect it from unequal heating and cracking. Air blasts have hitherto been used which were arranged to spread outwardly from the center of the mirror. Others rotated the mirror to produce uniform cooling.

According to the present invention, a special air duct is arranged behind the mirror, the design of which is such that the air blast cools the mirror completely and uniformly.

Cooling of this kind is of special value when mirrors use used which are provided with a central opening. Usually the negative electrode holder or the carbon itself is introduced through this opening. With such constuction it is not possible to obtain a uniform circulation over the rear surface of the mirror without a special design of the air ducts.

The air ducts behind the mirror are best formed in spiral or screw thread fashion. A spiral formation is a safeguard against unequal heating in circular zones. For that purpose there may be a spiral duct completely covering the rear of the mirror or only the inner central portion may have to be covered with such spiral air duct.

The use of a screw thread shaped duct behind the mirror permits of a uniform conduction of the air stream over the circumference of the mirror. In this manner the air is not first directed to one place but circulates in an almost uniform manner around the entire circumference of the mirror. The screw thread shaped ducts can also extend in a spiral form path and impart a whirling motion to the air current.

Furthermore it is advantageous to provide more than one duct to guide the air stream to several separated points simultaneously. This also provides more uniform cooling.

The separated ducts may be complete or again unite after traversing a part of their way. Thus the air can circulate completely over the mirror or over only a part of it by separated passages; for example, traverse half the mirror's rear surface by separate conduits which merge into one passage to cover the remaining surface.

It is also possible to direct the air inward from the circumference; that is, the direction of flow may be reversed. For this purpose ducts may be provided for the entire mirror surface or for only a portion of it. Therefore it is likewise advantageous to conduct the air stream tangentially; for instance when the cooling ducts are provided only for the central portion of the mirror and the air is drawn off. If a mirror is provided with air ducts according to this invention it is possible to make the usual sliding adjustments of the mirror without interfering with the operation of the cooling system. For this purpose the air ducts are built integral with the mirror and the air supply furnished through elastic or telescoping connections while the lamp house is preferably connected with an exhaust duct.

The invention is best understood from the accompanying drawing, in which.

Figures 1, 2:
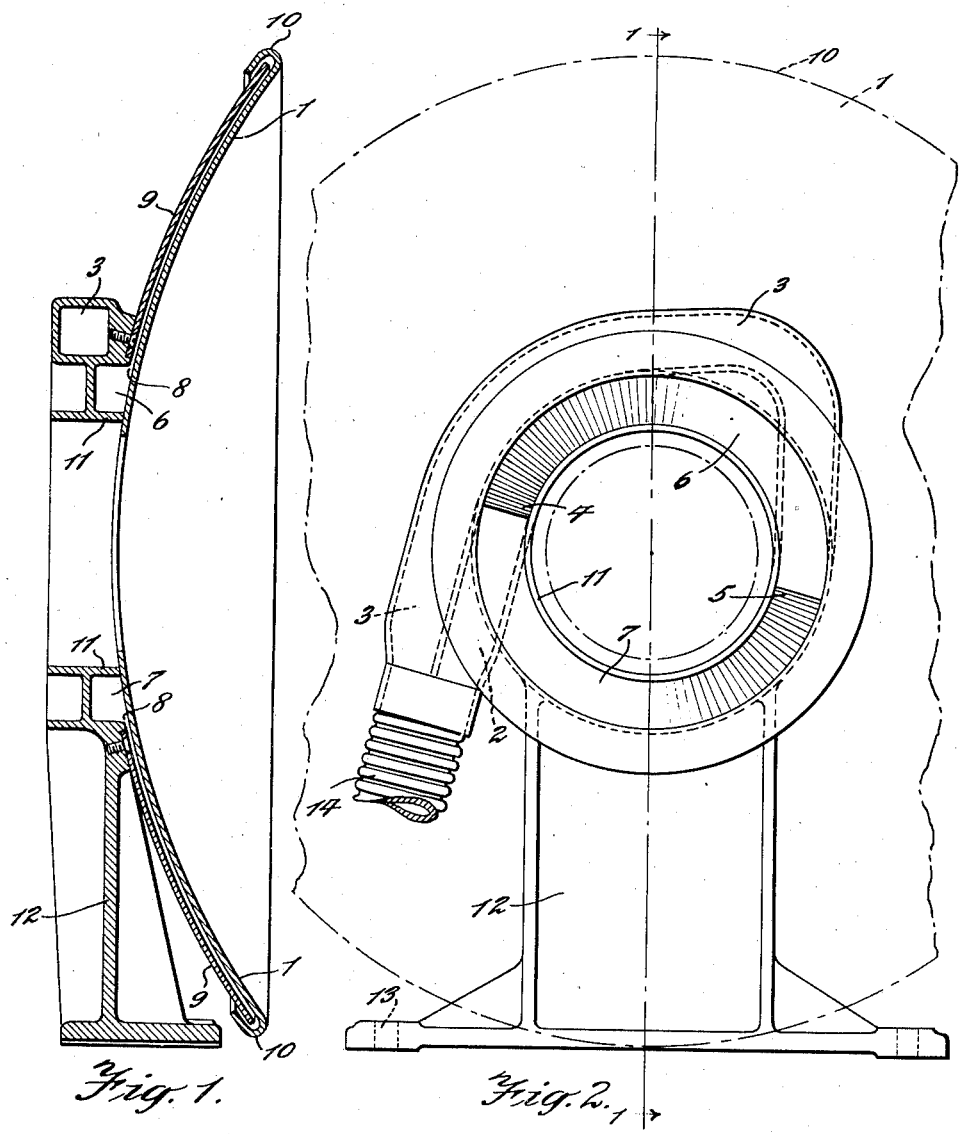
Fig. 1 is a section substantially on the line 1—1 of Fig. 2, but with the mirror shown in place.
Fig. 2 is a view from the right of Fig. 1, but with the mirror and certain other parts removed.

Referring now to the drawing in detail, the numeral 1 indicates a concave mirror in the center of which is an opening for the introduction of the carbon holder or the carbon, not shown. Behind the mirror are two air ducts 2 and 3 to which, from the common source 14, air is conducted to two separate places behind the mirror 1. The air passing through channel 2 enters at 4 the passage 6 which gradually decreases in depth in the direction parallel to the optical axis of the mirror and thus flattens the air stream and forms a screw shaped path for it. The air passing through channel 3 is conducted around the mirror in a half circle and at point 5 is led similarly through passage 7, which gradually decreases in depth from the point 5 so as to flatten out the air stream entering the passage at that point.

The air passes from the gradually flattening passages 6 and 7 at their ends and also through the opening 8 in the radially outer side walls thereof into the space between the back or rear surface of the mirror and the baffle 9, thus covering completely and uniformly the rear surface of the mirror and moving between the mirror and the conducting baffle 9 in a substantially spiral path. On the edge of the mirror the beading 10 conducts the air to the rear, thus avoiding any disturbance to the arc burning in front of the mirror. Some of the air thus deflected by the beading will pass between the mirror and the baffle and some on the back of the baffle, as will be apparent. Ultimately, of course, all of the air finds its way out between the beading and the back of the baffle, but is deflected in such a way that it does not cause any disturbance of the arc.

Any escape of the cooling air stream toward the center of the mirror is prevented by the ring 11. Since the mirror is integral with the air ducts, their addition does not affect adjustment of the mirror. The mirror together with the air ducts and the base 12 is movable and can be fastened in the correct position by means of binding screws through the hole 13. The channels of 2 and 3 are supplied with air by means of the flexible tube 14.

While the invention is shown as embodied in a specific form, it is to be understood that various changes in details may be made without departing from the scope of the invention, as defined by the appended claims.

What is claimed is:

1. In combination, a concave mirror adapted to be used with a lamp, an elongated passage on the rear of said mirror and having its longitudinal axis extending around the center and along the rear surface of the mirror closely adjacent thereto and gradually decreasing in depth along said axis and having a discharge outlet extending substantially tangentially of said rear surface.

2. In combination, a concave mirror adapted to be used with a lamp, an elongated passage on the rear of said mirror and having its longitudinal axis extending around the center and along the rear surface of the mirror closely adjacent thereto and gradually decreasing in depth along said axis and having a discharge outlet extending substantially tangentially of said rear surface, and means for introducing air to said passage at a plurality of points therein.

3. In combination, a concave mirror adapted to be used with a lamp, an elongated passage on the rear of said mirror and having its longitudinal axis extending around the center and along the rear surface of the mirror closely adjacent thereto and gradually decreasing in depth along said axis and having a discharge outlet extending substantially tangentially of said rear surface, and a baffle closely adjacent said rear surface of the mirror to keep said air in close contact with said surface after discharge from said passage.

4. In combination, a concave mirror adapted to be used with a lamp, an elongated passage on the rear of said mirror and having its longitudinal axis extending around the center and along the rear surface of the mirror closely adjacent thereto and gradually decreasing in depth along said axis and having a discharge outlet extending substantially tangentially of said rear surface, and means preventing escape of said air from said passage towards the center of the mirror.

5. In combination, a concave mirror adapted to be used with a lamp, an elongated passage on the rear of said mirror and having its longitudinal axis extending around the center and along the rear surface of the mirror closely adjacent thereto and gradually decreasing in depth along said axis and having a discharge outlet extending substantially tangentially of said rear surface, and a bead on the edge of said mirror folded back over the edge of said baffle to prevent said air from passing towards the front of the mirror.

6. In combination, a concave mirror adapted to be used with a lamp, an elongated passage on the rear of said mirror and having its longitudinal axis extending around the center and along the rear surface of the mirror closely adjacent thereto and having a discharge outlet extending substantially tangentially of said rear surface.

7. In combination, a concave mirror adapted to be used with a lamp, an elongated passage on the rear of said mirror and having its longitudinal axis extending around the center and along the rear surface of the mirror closely adjacent thereto and gradually decreasing in depth along said axis and having a discharge outlet extending substantially tangentially of said rear surface, and the edge of said mirror being folded back to prevent said air from passing towards the front of the mirror.

8. In combination, a concave mirror adapted to be used with a lamp, an elongated passage on the rear of said mirror and having its longitudinal axis extending around the center and along the rear surface of the mirror closely adjacent thereto and having a discharge outlet extending substantially tangentially of said rear surface and the radially outer wall of said passage having an opening therein to discharge air along the rear surface of the mirror.

9. In combination, a concave mirror adapted to be used with a lamp, an elongated passage on the rear of said mirror and having its longitudinal axis extending around the center and along the rear surface of the mirror closely adjacent thereto and gradually decreasing in depth along said axis and having a discharge outlet extending substantially tangentially of said rear surface, and a baffle closely adjacent said rear surface of the mirror to keep said air in close contact with said surface after discharge from said passage and the radially outer wall of said passage having an opening therein leading from the interior of the passage to the space between the mirror and the baffle.

WALTER PETERMANN.